US010994374B2

(12) United States Patent
Yamanashi et al.

(10) Patent No.: US 10,994,374 B2
(45) Date of Patent: May 4, 2021

(54) LASER PROCESSING MACHINE AND LASER PROCESSING METHOD

(71) Applicant: AMADA HOLDINGS CO., LTD., Kanagawa (JP)

(72) Inventors: Takaaki Yamanashi, Kanagawa (JP); Kouji Funaki, Kanagawa (JP); Dennis Pohle, Kanagawa (JP)

(73) Assignee: AMADA HOLDINGS CO., LTD., Kanagawa (JP)

( * ) Notice: Subject to any disclaimer, the term of this patent is extended or adjusted under 35 U.S.C. 154(b) by 228 days.

(21) Appl. No.: 16/097,973

(22) PCT Filed: Oct. 2, 2018

(86) PCT No.: PCT/JP2018/036909
§ 371 (c)(1),
(2) Date: Oct. 31, 2018

(87) PCT Pub. No.: WO2019/176149
PCT Pub. Date: Sep. 19, 2019

(65) Prior Publication Data
US 2020/0122274 A1    Apr. 23, 2020

(30) Foreign Application Priority Data

Mar. 14, 2018    (DE) .......................... 102018203899.6

(51) Int. Cl.
*B23K 26/064*    (2014.01)
*B23K 26/06*    (2014.01)
(Continued)

(52) U.S. Cl.
CPC .......... *B23K 26/38* (2013.01); *B23K 26/0006* (2013.01); *B23K 26/064* (2015.10);
(Continued)

(58) Field of Classification Search
CPC ........ B23K 26/06; B23K 26/064–0652; B23K 26/0006; B23K 26/083;
(Continued)

(56) References Cited

U.S. PATENT DOCUMENTS 5,491,318 A * 2/1996 Sugawara ............ B23K 26/364
219/121.67
5,984,159 A * 11/1999 Ostendarp ............ B23K 26/073
225/93.5
(Continued)

FOREIGN PATENT DOCUMENTS

JP        3-36380 U        4/1991
JP        7-236987          9/1995
(Continued)

OTHER PUBLICATIONS

English translation of Dec. 18, 2018 International Search Report in corresponding international application PCT/JP2018/036909.
(Continued)

*Primary Examiner* — Michael A Laflame, Jr.
(74) *Attorney, Agent, or Firm* — Greenblum & Bernstein, P.L.C.

(57) ABSTRACT

The laser processing machine includes a beam oscillation mechanism that oscillates a beam spot on a surface of a sheet metal. The control device controls the beam oscillation mechanism so as to oscillate the beam spot with an oscillation component in a direction orthogonal to a cutting direction of the sheet metal in a non-holding region, in which a holding portion of the conveyance apparatus for conveying a product is not held, when cutting the product from the sheet metal by irradiating the sheet metal with the laser beam. The non-holding region is at least a part of a periphery of a protrusion portion of the product, or at least
(Continued)

a part of a periphery of a recess forming region in which a recess of the product is formed.

6 Claims, 10 Drawing Sheets

(51) Int. Cl.
    *B23K 26/38*     (2014.01)
    *B23K 26/00*     (2014.01)
    *B23K 26/08*     (2014.01)
    *B23K 37/02*     (2006.01)
    *B23K 37/04*     (2006.01)
    *B23K 101/18*     (2006.01)
    *B23K 103/04*     (2006.01)

(52) U.S. Cl.
    CPC ........ *B23K 26/083* (2013.01); *B23K 26/0884* (2013.01); *B23K 37/0211* (2013.01); *B23K 37/0288* (2013.01); *B23K 37/0408* (2013.01); *B23K 2101/18* (2018.08); *B23K 2103/05* (2018.08)

(58) Field of Classification Search
    CPC ......... B23K 26/0869–0884; B23K 26/32–322; B23K 26/40; B23K 37/0211–0235; B23K 37/0288; B23K 37/04–0408
    See application file for complete search history.

(56) References Cited

U.S. PATENT DOCUMENTS

| | | | | |
|---|---|---|---|---|
| 2001/0023527 | A1* | 9/2001 | Beyer | B23K 26/26 29/527.7 |
| 2002/0122445 | A1* | 9/2002 | Jerby | H01S 3/0975 372/29.023 |
| 2002/0148819 | A1* | 10/2002 | Maruyama | B23K 26/064 219/121.78 |
| 2017/0291262 | A1* | 10/2017 | Ishiguro | H01S 5/00284 |

FOREIGN PATENT DOCUMENTS

| | | |
|---|---|---|
| JP | 2005-279730 A | 10/2005 |
| JP | 2010-162561 | 7/2010 |
| JP | 2011-136356 | 7/2011 |
| JP | 2013-39591 | 2/2013 |
| JP | 2017-104891 A | 6/2017 |
| JP | 2018-183793 A | 11/2018 |
| KR | 10-2016-0138799 | 12/2016 |
| WO | 2017/139769 | 8/2017 |

OTHER PUBLICATIONS

English translation of Dec. 18, 2018 Written Opinion of International Searching Authority in corresponding international application PCT/JP2018/036909.

Mar. 29, 2021, European Search Report issued in European Application No. 18909625.8.

* cited by examiner

LASER PROCESSING MACHINE AND LASER PROCESSING METHOD

TECHNICAL FIELD

The present disclosure relates to a laser processing machine and a laser processing method for processing a sheet metal with a laser beam.

BACKGROUND ART

Laser processing machines have been widely used to cut a sheet metal with a laser beam emitted from a laser oscillator, and to manufacture a product having a predetermined shape. The product cut by the laser processing machine may be conveyed by a conveyance apparatus. The conveyance apparatus conveys the products suck by a suction pad (see Patent Literature 1).

CITATION LIST

Patent Literature

[PTL 1]
Japanese Unexamined Patent Application Publication No. 2011-136356

SUMMARY OF INVENTION

In recent years, as a laser oscillator for emitting a laser beam used in a laser processing machine, a small-sized and low cost fiber laser oscillator or direct diode laser oscillator (DDL oscillator) is widely used as compared with a large-sized and high cost $CO_2$ laser oscillator.

A wavelength of a laser beam emitted from the $CO_2$ laser oscillator is about 10 μm, whereas a wavelength of a laser beam emitted from the fiber laser oscillator or the DDL oscillator is about 1 μm. Therefore, the laser beam emitted from the fiber laser oscillator or the DDL oscillator has a small beam waist, and a groove formed around the product by irradiation of the laser beam has a very narrow kerf width. Therefore, when the product cut by the laser processing machine is to be conveyed by the conveyance apparatus, the product may be caught in a base material and the product may fail to be conveyed.

An object of one or more embodiments is to provide a laser processing machine and a laser processing method capable of reducing failure of conveyance of a product cut from a sheet metal by a conveying apparatus.

A first aspect of one or more embodiments provides a laser processing machine including: a processing head in which a nozzle is attached to a tip, the nozzle emitting a laser beam from an opening; a focusing lens that is provided in the processing head and irradiates a sheet metal with the laser beam by focusing the laser beam, thereby forming a beam spot on a surface of the sheet metal; a moving mechanism configured to move a relative position of the processing head with respect to the surface of the sheet metal; a beam oscillation mechanism configured to oscillate the beam spot on the surface of the sheet metal by oscillating the laser beam emitted from the opening in the opening; and a control device configured to control the beam oscillation mechanism so as to oscillate the beam spot with an oscillation pattern including an oscillation component in a direction orthogonal to a cutting direction of the sheet metal in a non-holding region, in which a holding unit of a conveyance apparatus for conveying a product is not held, when cutting the product from the sheet metal by moving the relative position of the processing head using the moving mechanism and irradiating the sheet metal with the laser beam, the non-holding region being at least a part of a periphery of a protrusion portion of the product, or at least a part of a periphery of a recess forming region in which a recess portion of the product is formed.

A second aspect of one or more embodiments provides a laser processing method including: irradiating a sheet metal on a surface of a sheet metal from an opening of a nozzle with a focused laser beam; moving a beam spot formed on the surface of the sheet metal along an end of a product so as to cut the product from the sheet metal; and oscillating the beam spot in a non-holding region, in which a holding unit of a conveyance apparatus for conveying the product is not held, with an oscillation pattern including an oscillation component in a direction orthogonal to a cutting direction of the sheet metal when cutting a periphery of a protrusion portion of the product, or a periphery of a recess forming portion, the non-holding region being at least a part of a periphery of the protrusion portion or the recess portion, whereby a kerf width formed on the sheet metal is widened.

In accordance with the laser processing machine and the laser processing method according to one or more embodiments, it is possible for the conveyance apparatus to reduce failure of conveyance of the product, which is cut from the sheet metal.

DESCRIPTION OF EMBODIMENTS

Figure 1:
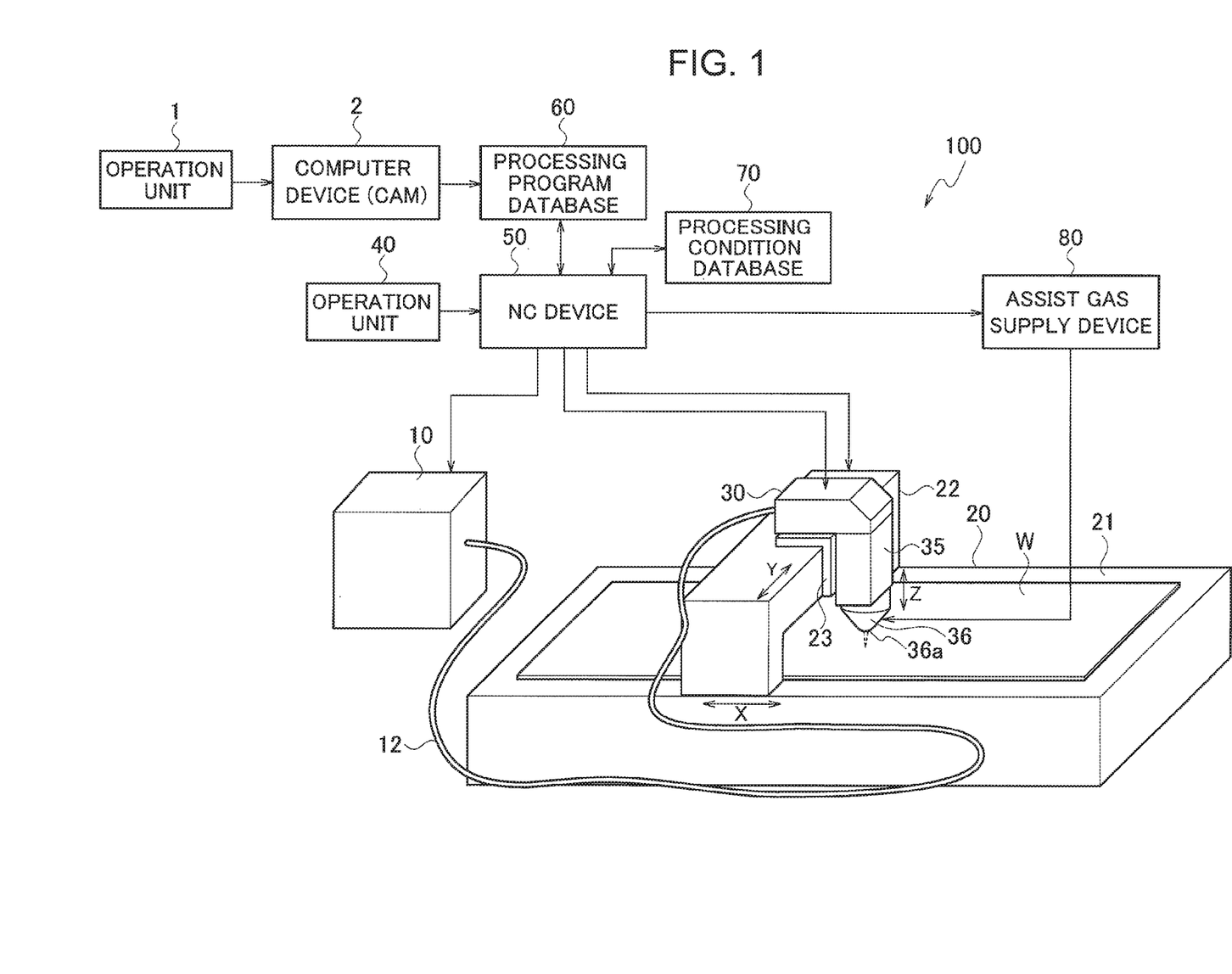
FIG. 1 is a diagram illustrating an overall configuration example of a laser processing machine according to one or more embodiments.

A laser processing machine and a laser processing method according to one or more embodiments will be described below with reference to the accompanying drawings. In FIG. 1, a laser processing machine 100 includes: a laser oscillator 10 that generates and emits a laser beam; a laser processing unit 20; and a process fiber 12 that transmits the laser beam emitted from the laser oscillator 10 to the laser processing unit 20. In addition, the laser processing machine 100 includes an operation unit 1, a computer device 2 functioning as a CAM, an operation unit 40, an NC device 50, a processing program database 60, a processing condition database 70, and an assist gas supply device 80.

The NC device 50 is an example of a control device that controls each portion of the laser processing machine 100. The operation unit 1 and the computer device 2 are host devices for the laser processing machine 100, and may be provided outside the laser processing machine 100.

As the laser oscillator 10, a laser oscillator that amplifies an excitation beam emitted from a laser diode to emit a laser beam having a predetermined wavelength, or a laser oscillator that directly uses a laser beam emitted from a laser diode is preferable. Examples of the laser oscillator 10 include a solid laser oscillator, a fiber laser oscillator, a disk laser oscillator, and a direct diode laser oscillator (DDL oscillator).

The laser oscillator 10 emits a 1 μm band laser beam having a wavelength of 900 nm to 1100 nm. A fiber laser oscillator or a DDL oscillator will be described as an example. A fiber laser oscillator emits a laser beam having a wavelength of 1060 nm to 1080 nm, and a DDL oscillator emits a laser beam having a wavelength of 910 nm to 950 nm.

The laser processing unit 20 includes: a processing table 21 on which sheet metal W as a processing target is placed; a gate type X-axis carriage 22; a Y-axis carriage 23; a collimator unit 30 that is fixed to the Y-axis carriage 23; and a processing head 35. The X-axis carriage 22 is configured to be movable on the processing table 21 in the X-axis direction. The Y-axis carriage 23 is configured to be movable on the X-axis carriage 22 in the Y-axis direction perpendicular to the X-axis. The X-axis carriage 22 and the Y-axis carriage 23 function as a moving mechanism for moving the processing head 35 along the surface of the sheet metal W in the X-axis direction, the Y-axis direction, or an arbitrary combination direction of the X-axis and the Y-axis. The sheet metal W is stainless steel, for example.

Instead of moving the processing head 35 along the surface of the sheet metal W, the moving mechanism may be configured such that the position of the processing head 35 is fixed and the sheet metal W moves. The laser processing machine 100 may include a moving mechanism that moves the position of the processing head 35 relative to the surface of the sheet metal W.

A nozzle 36 is attached to the processing head 35, the nozzle 36 having a circular opening 36a at the tip portion and emitting a laser beam through the opening 36a. The sheet metal W is irradiated with the laser beam emitted through the opening 36a of the nozzle 36. The assist gas supply device 80 supplies nitrogen as assist gas to the processing head 35, for example. During processing of the sheet metal W, the assist gas is blown toward the sheet metal W through the opening 36a. The assist gas discharges molten metal in the kerf that is obtained by melting the sheet metal W.

Figure 2:
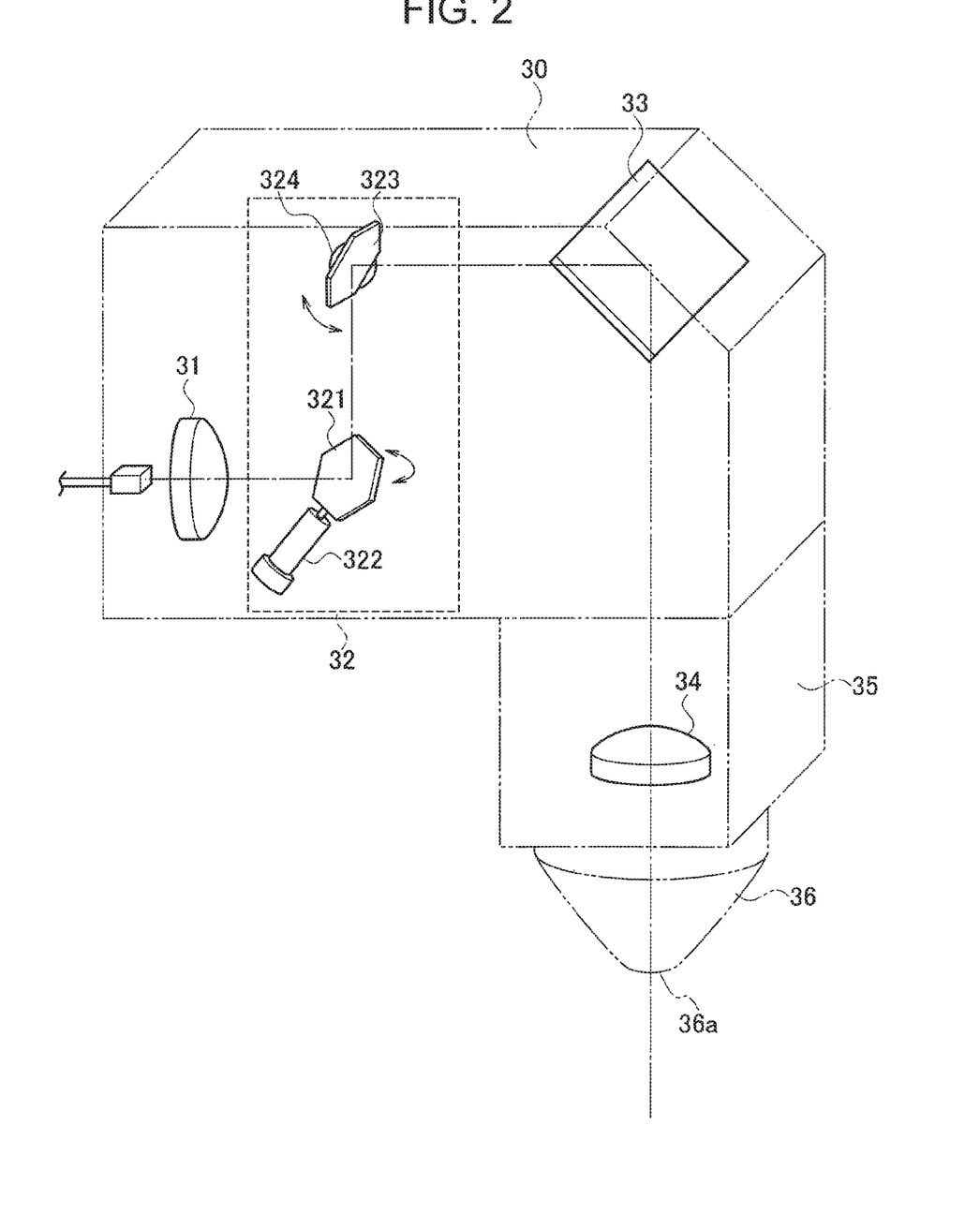
FIG. 2 is a perspective view illustrating a specific configuration example of a collimator unit and a processing head in the laser processing machine according to one or more embodiments.

As illustrated in FIG. 2, the collimator unit 30 includes a collimation lens 31 that converts a laser beam that is a divergent light emitted from the process fiber 12 into a parallel light (collimated light). In addition, the collimator unit 30 includes: a galvano scanner unit 32; a bend mirror 33 that reflects a laser beam emitted from the galvano scanner unit 32 downward in a Z-axis direction perpendicular to the X-axis and the Y-axis. The processing head 35 includes a focusing lens 34 that focuses the laser beam reflected from the bend mirror 33 and irradiates the sheet metal W with the focused laser beam.

The laser processing machine 100 is centered such that the laser beam emitted through the opening 36a of the nozzle 36 is positioned at the center of the opening 36a. In the standard state, the laser beam is emitted from the center of the opening 36a. The galvano scanner unit 32 functions as a beam oscillation mechanism that oscillates the laser beam, which propagates in the processing head 35 and is emitted through the opening 36a, in the opening 36a. The method of oscillating the laser beam using the galvano scanner unit 32 will be described below.

The galvano scanner unit 32 includes: a scanning mirror 321 that reflects the laser beam emitted from the collimation lens 31; and a driver 322 that rotates the scanning mirror 321 to a predetermined angle. In addition, the galvano scanner unit 32 includes: a scanning mirror 323 that reflects the laser beam emitted from the scanning mirror 321; and a driver 324 that rotates the scanning mirror 323 to a predetermined angle.

The drivers 322 and 324 reciprocate the scanning mirrors 321 and 323 in predetermined angle ranges, respectively, under the control of the NC device 50. By reciprocating either or both of the scanning mirrors 321 and 323, the galvano scanner unit 32 oscillates the laser beam with which the sheet metal W is irradiated.

The galvano scanner unit 32 is an example of the beam oscillation mechanism, and the beam oscillation mechanism is not limited to the galvano scanner unit 32 including the pair of scanning mirrors.

Figure 3:
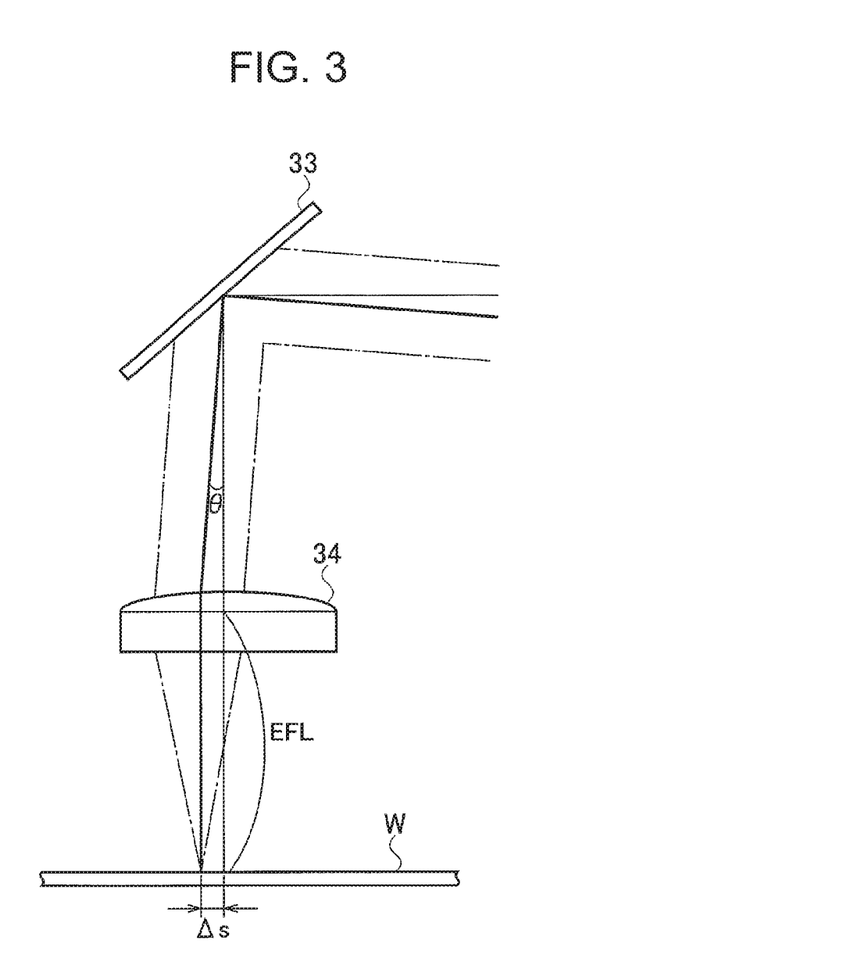
FIG. 3 is a view illustrating displacement of an irradiation position of a laser beam on a sheet metal caused by a beam oscillation mechanism.

FIG. 3 illustrates a state where either or both of the scanning mirrors 321 and 323 are tilted such that the position of the laser beam with which the sheet metal W is irradiated is displaced. In FIG. 3, a thin solid line that is folded in the bend mirror 33 and passes through the focusing lens 34 represents the optical axis of the laser beam when the laser processing machine 100 is in the standard state.

Specifically, due to the operation of the galvano scanner unit 32 positioned in front of the bend mirror 33, the angle of the optical axis of the laser beam incident on the bend mirror 33 changes, and the optical axis deviates from the center of the bend mirror 33. In FIG. 3, for simplification, positions in which the laser beam is incident on the bend mirror 33 before and after the operation of the galvano scanner unit 32 are illustrated to be the same.

Due to the action of the galvano scanner unit 32, the optical axis of the laser beam is displaced from the position indicated by a thin solid line to the position indicated by a thick solid line. In the case where the laser beam reflected from the bend mirror 33 is tilted by an angle θ, an irradiation position of the laser beam on the sheet metal W is displaced by the distance Δs. In the case where the focal length of the focusing lens 34 is represented by EFL (effective focal length), the distance Δs is calculated as EFL/sin θ.

In the case where the galvano scanner unit 32 tilts the laser beam in a direction opposite to the direction indicated in FIG. 3 by the angle θ, the irradiation position of the laser beam on the sheet metal W can be displaced in the direction opposite to the direction indicated in FIG. 3 by the distance Δs. The distance Δs is shorter than the radius of the opening 36a and is preferably a maximum difference or shorter, the maximum difference being obtained by subtracting a predetermined allowance from the radius of the opening 36a.

By controlling the drivers 322 and 324 of the galvano scanner unit 32, the NC device 50 can oscillate the laser beam in a predetermined direction in the plane of the sheet metal W. By oscillating the laser beam, the beam spot formed on the surface of the sheet metal W can be oscillated.

The laser processing machine 100 having the above-described configuration manufactures a product having a predetermined shape by cutting the sheet metal W using the laser beam emitted from the laser oscillator 10.

Figure 4:
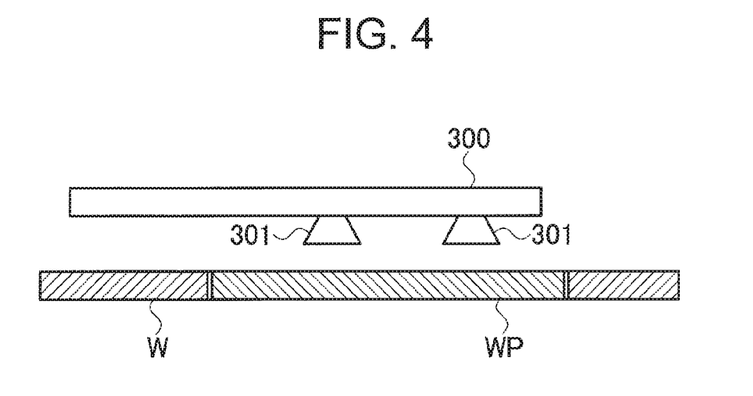
FIG. 4 is a view illustrating an example of a schematic configuration of a conveyance apparatus for conveying a product cut from a sheet metal.

As illustrated in FIG. 4, when the laser processing machine 100 cut a product WP from a sheet metal W, a conveyance apparatus 300 conveys the product WP. The product WP is a product which has an unspecified and arbitrary shape. The conveyance apparatus 300 includes a plurality of suction pads 301, and sucks the product WP using the suction pads 301 to convey the product WP. The suction pad 301 is one example of a holding unit which holds the product WP. The product WP may be conveyed by the conveyance apparatus which includes a holding unit gripping the product WP instead of the suction pad, for example.

Figure 5:
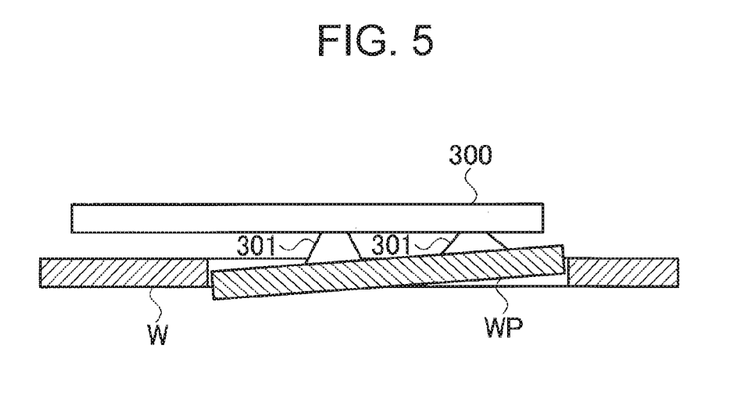
FIG. 5 is a view illustrating a state in which a product to be conveyed by the conveyance apparatus is caught in a base material and fails to be conveyed.

As described above, as illustrated in FIG. 5, since a kerf width of a groove formed near the product WP is very narrow, when the product WP is conveyed by the conveyance apparatus 300, the product WP may be caught in the base material to fail the conveyance of the product WP.

Figure 6:
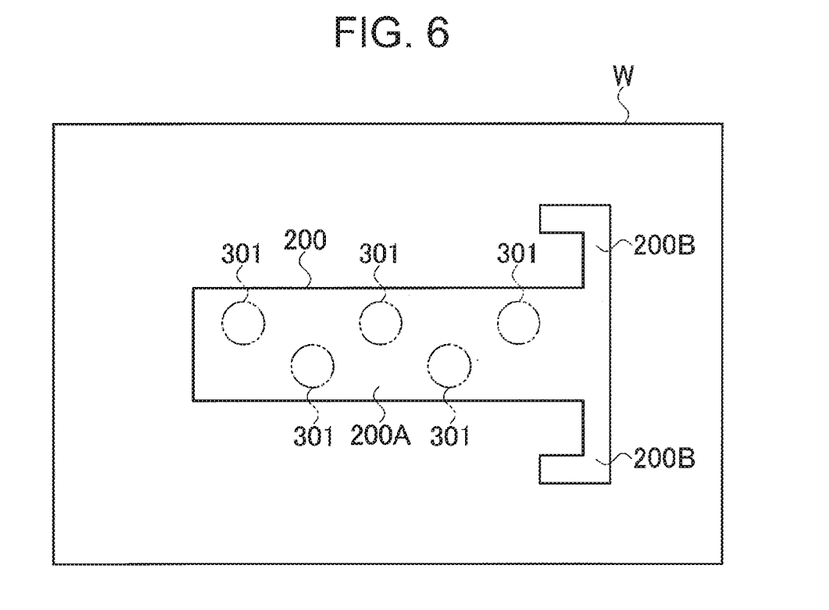
FIG. 6 is a view illustrating the first example of a shape of a product which is caught in the base material and is likely to fail to be conveyed.

FIG. 6 illustrates a product 200 as the first example of the product WP having a shape which is easily caught in the base material to fail the conveyance. The product 200 illustrated in FIG. 6 includes a main portion 200A which occupies most of the region of the product 200 and a pair of protrusion portions 200B which occupy a slight region of the product 200 and protrudes from the main portion 200A. In this case, the conveyance apparatus 300 makes a plurality of the suction pads 301 suck the main portion 200A, and conveys the cut product 200 out. The protrusion portion 200B is a non-suction region (non-holding region) in which the conveyance apparatus 300 is not sucked by the suction pad 301.

When the conveyance apparatus 300 conveys the product 200 out, the main portion 200A sucked by the suction pad 301 is lifted up first, and thus the product 200 is inclined. Similarly to FIG. 5, when the protrusion portion 200B which is formed in a fine shape and has a narrow peripheral kerf width is inclined, the protrusion portion 200B may be caught in the base material. Then, the conveyance apparatus 300 may fail to convey the product 200.

Figure 7:
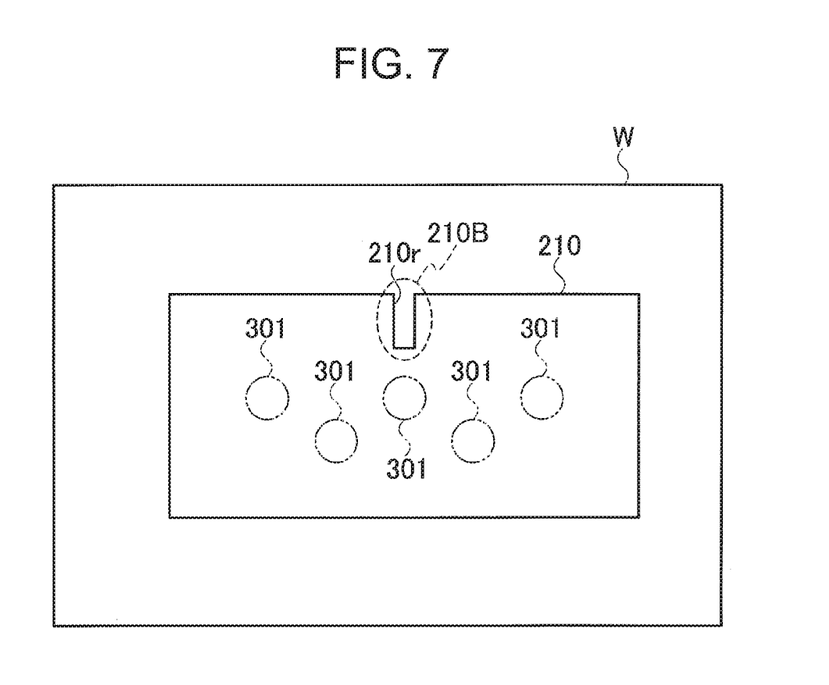
FIG. 7 is a view illustrating the second example of a shape of a product which is caught in the base material and is likely to fail to be conveyed.

FIG. 7 illustrates a product 210 as the second example of the product WP having a shape which is easily caught in the base material and fails the conveyance. The product 210 has a recess forming portion 210B formed with the recess portion 210r. The recess forming portion 210B is the region of the end part of the product 210 which is adjacent to the recess portion 210r. Even in this case, when the conveyance apparatus 300 conveys the product 210 out, the recess forming region 210B may be caught in the base material, so that the conveyance apparatus 300 fails to convey the product 210. The recess forming region 210B is a non-suction region (non-holding region) in which the conveyance apparatus 300 is not sucked by the suction pad 301.

The product 210 is an example having a shape which is easy to be caught in the base material and fails the conveyance even in a case where the product 210 has a protrusion portion protruding from the outer circumference of the product 210 instead of the recess portion 210r illustrated in FIG. 7.

Next, using a case where the product 200 is cut from the sheet metal W as an example, a description will be given about a specific method for reducing the failure of the conveyance of the product 200. FIGS. 8A to 8F illustrate examples of an oscillation pattern in which a NC device 50 oscillates a laser beam by a galvano scanner unit 32. In FIGS. 8A to 8F, a cutting direction of the sheet metal W is set as an x direction, and a direction which is perpendicular to the x direction in the surface of the sheet metal W is set as a y direction. The NC device 50 can select any oscillation pattern according to the instruction of the operator through the operation unit 40.

Figure 8A:
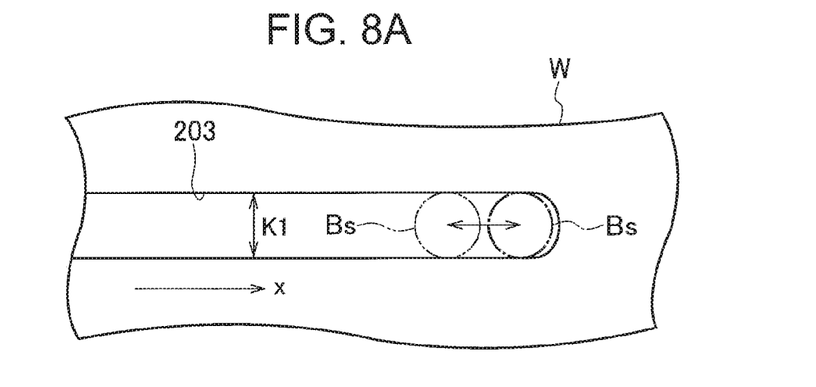
FIG. 8A is a view illustrating a parallel oscillation pattern of the laser beam.

For the convenience of understanding the oscillation pattern, FIGS. 8A to 8F illustrate the oscillation patterns in a state where a processing head 35 is moved in the x direction. FIG. 8A illustrates an oscillation pattern in which a beam spot Bs is oscillated in the x direction in the groove 203 formed by the progressing of the beam spot Bs. The oscillation pattern illustrated in FIG. 8A is referred to as a parallel oscillation pattern. When the frequency in which the beam spot Bs is oscillated in a direction parallel to the cutting direction is set as Fx, and the frequency in which the beam spot Bs is oscillated in a direction perpendicular to the cutting direction is set as Fy, the parallel oscillation pattern is an oscillation pattern in which Fx:Fy is 1:0.

Figure 8B:
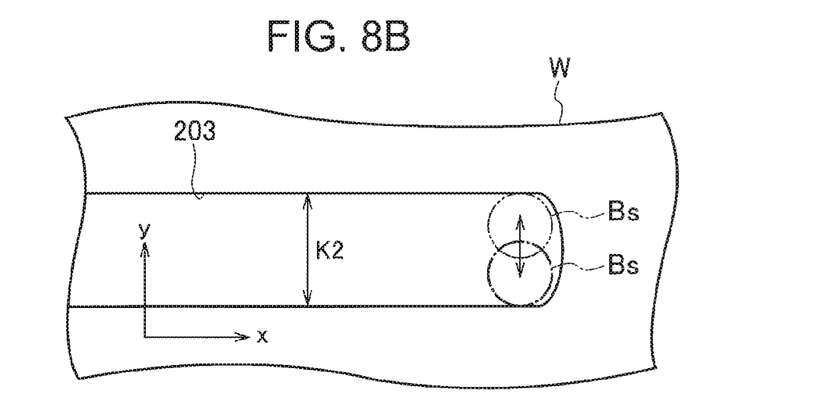
FIG. 8B is a view illustrating an orthogonal oscillation pattern of the laser beam.

FIG. 8B illustrates an oscillation pattern which oscillates the beam spot Bs in the y direction. By oscillating the beam spot Bs in the y direction, the groove 203 becomes a kerf width K2 wider than the kerf width K1. The oscillation pattern illustrated in FIG. 8B is referred to as a perpendicular oscillation pattern. The perpendicular oscillation pattern is an oscillation pattern in which Fx:Fy is 0:1.

Figure 8C:
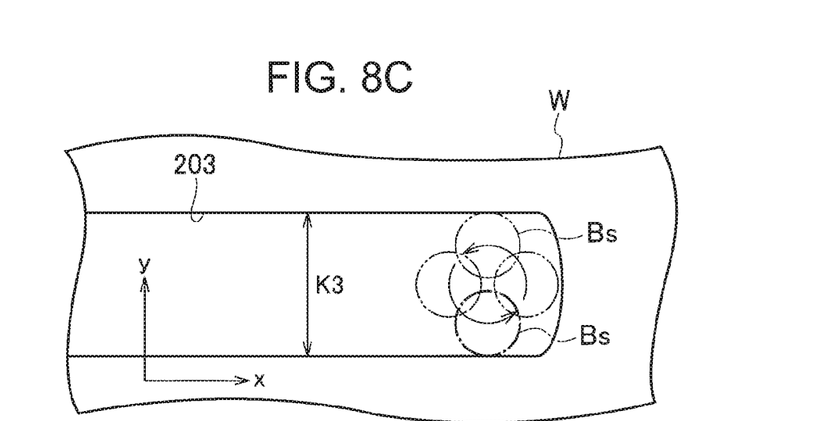
FIG. 8C is a view illustrating a circular oscillation pattern of the laser beam.

FIG. 8C illustrates an oscillation pattern which oscillates the beam spot Bs such that the beam spot Bs draws a circle. By oscillating the beam spot Bs in a circular shape, the groove 203 becomes a kerf width K3 wider than the kerf width K1. The oscillation pattern illustrated in FIG. 8C is referred to as a circle oscillation pattern. The circle oscillation pattern is an oscillation pattern in which Fx:Fy is 1:1.

Figure 8D:
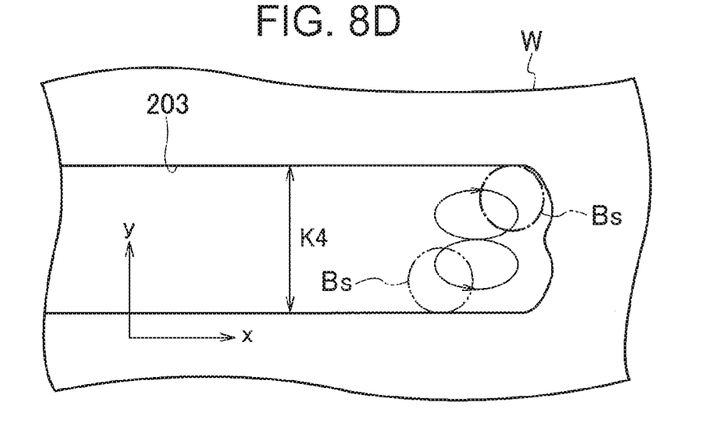
FIG. 8D is a view illustrating an 8-shaped oscillation pattern of a laser beam.

FIG. 8D illustrates an oscillation pattern which oscillates the beam spot Bs such that the beam spot Bs draws the shape of number 8. By oscillating the beam spot Bs in an 8 shape, the groove 203 becomes a kerf width K4 wider than the kerf width K1. The oscillation pattern illustrated in FIG. 8D is referred to as an 8-shaped oscillation pattern. The 8-shaped oscillation pattern is an oscillation pattern in which Fx:Fy is 2:1.

Figure 8E:
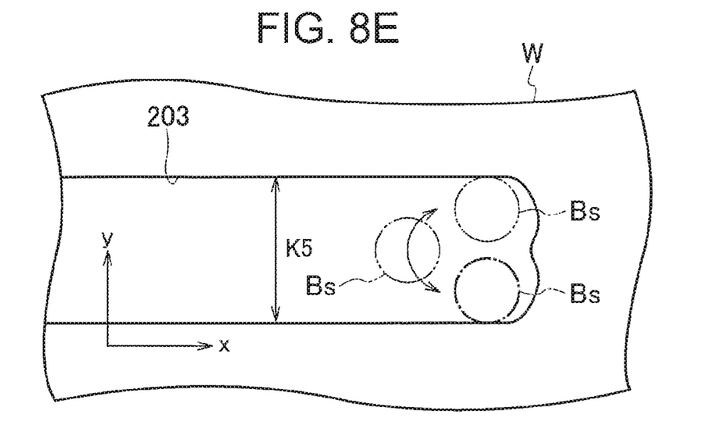
FIG. 8E is a view illustrating a C-shaped oscillation pattern of a laser beam.

FIG. 8E illustrates an oscillation pattern which oscillates the beam spot Bs such that the beam spot Bs draws a shape of alphabet C. By oscillating the beam spot Bs in the C shape, the groove 203 becomes a kerf width K5 wider than the kerf width K1. The oscillation pattern illustrated in FIG. 8E is referred to as a C-shaped oscillation pattern. The C-shaped oscillation pattern is an oscillation pattern in which Fx:Fy is 2:1.

Figure 8F:
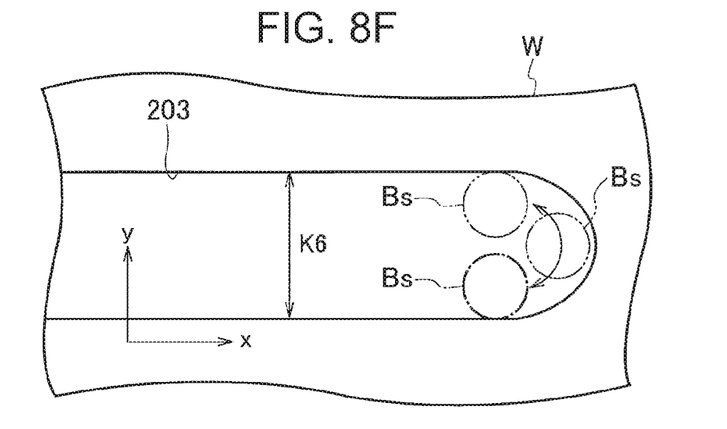
FIG. 8F is a view illustrating an inverted C-shaped oscillation pattern of a laser beam.

FIG. 8F illustrates an oscillation pattern which oscillates the beam spot Bs such that the beam spot Bs draws an inverted C shape to which the alphabet of C is turned in a right and left direction. By oscillating the beam spot Bs in the inverted C shape, the groove 203 becomes a kerf width K6 wider than the kerf width K1. The oscillation pattern illustrated in FIG. 8F is referred to as an inverted C-shaped oscillation pattern. The inverted C-shaped oscillation pattern is an oscillation pattern in which Fx:Fy is 2:1.

Figure 9:
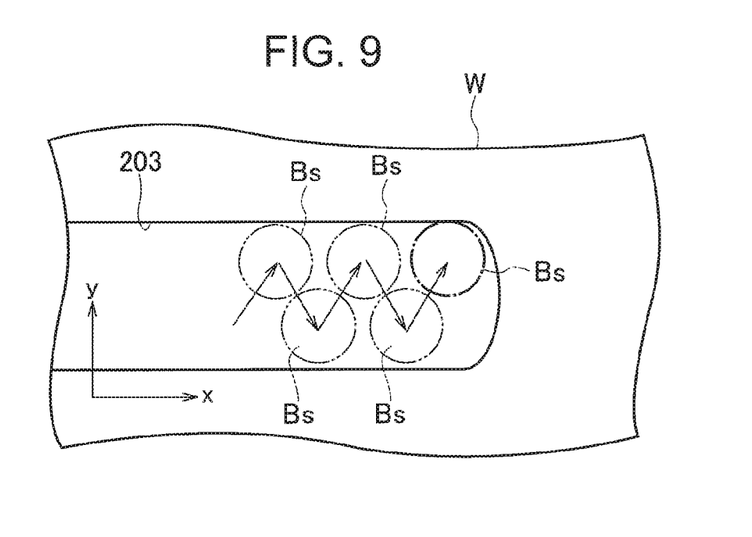
FIG. 9 is a view illustrating an actual oscillation pattern when the orthogonal oscillation pattern illustrated in FIG. 8B is used.

In practice, the laser beam is oscillated while the processing head 35 is moved in the cutting direction, and thus the oscillation pattern becomes the oscillation pattern obtained by adding the displacement in the cutting direction (x direction) to the oscillation patterns illustrated in FIGS. 8A to 8F. When the perpendicular oscillation pattern illustrated in FIG. 8B is used as an example, the beam spot Bs is oscillated in the y direction while being moved in the x direction, and thus the actual perpendicular oscillation pattern becomes the oscillation pattern illustrated in FIG. 9.

Figure 10:
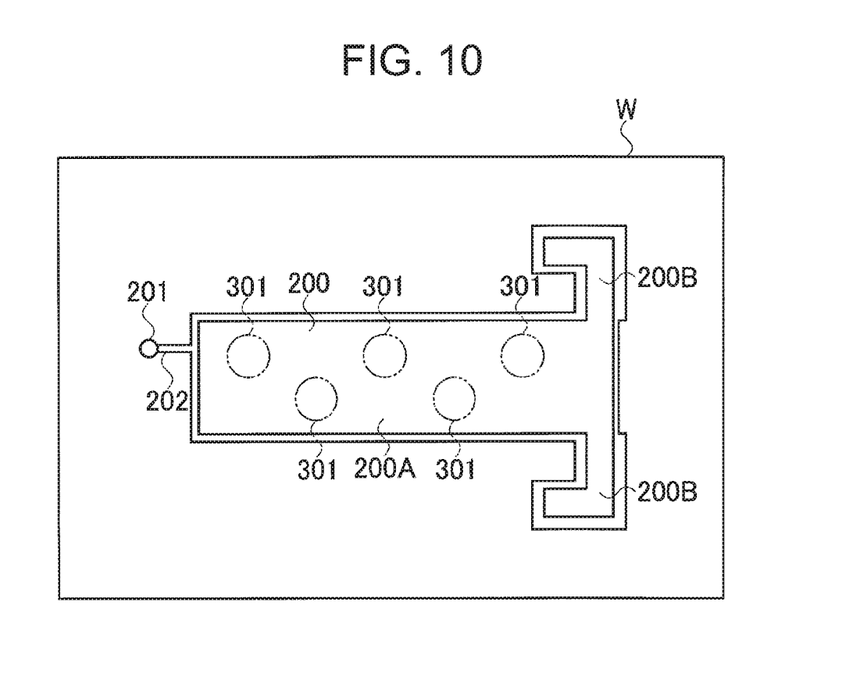
FIG. 10 is an overall view illustrating a method of cutting a product from a sheet metal with the laser processing machine and the laser processing method according to one or more embodiments.

Computer device 2 creates a processing program for cutting the product 200 illustrated in FIG. 6 from the sheet metal W. Specifically, as illustrated in FIG. 10, the computer device 2 creates a processing program that opens a pierce 201 in a predetermined position on the outside of the product 200, cut an approach 202 after opening the pierce 201, and cuts the sheet metal W from the end part, which is near the product 200, of the approach 202 side along the outer circumference of the product 200.

The computer device 2 creates a processing program which includes information indicating which suction pad 301 becomes effective among a plurality of suction pads 301 of the conveyance apparatus 300 to suck which position of the product 200. Which suction pad 301 becomes effective to suck which position of the product 200 may be decided automatically based on the shape of the product 200 by the computer device 2, or may be decided in such a manner that the operator operates the operation unit 1. The computer device 2 may decide automatically the setting relating to the suction pad 301 and the operator may correct the content decided by operating the operation unit 1.

Based on the processing program, an NC device (not illustrated) which controls the conveyance apparatus 300 performs control such that the product 200 is sucked by the suction pad 301 to be conveyed. The NC device 50 which controls the laser processing machine 100 and the NC device which controls the conveyance apparatus 300 are cooperated with each other to control the laser processing machine 100 and the conveyance apparatus 300, respectively. The NC device 50 may be configured to control the laser processing machine 100 and the conveyance apparatus 300.

The computer device 2 creates the processing program which designates the position where the sheet metal W is cut using any oscillation pattern including the oscillation component of the y direction illustrated in FIGS. 8B to 8F in the vicinity of the product 200. The operator may operate the operation unit 1 to designate the position where the sheet metal W is cut using the oscillation pattern including the oscillation component of the y direction. Based on the shape of the product 200, the computer device 2 may automatically decide the position where the sheet metal W is cut using the oscillation pattern including the oscillation component of the y direction.

In a case where the computer device 2 decides the above-described position automatically, the non-suction region where the conveyance apparatus 300 does not suck the product 200 by the suction pad 301 may be set as the position where the sheet metal W is cut using the oscillation pattern including the oscillation component of the y direction. Specifically, in the case of the product 200 illustrated in FIG. 6, at least a part (preferably, the entire portion) in the vicinity of the protrusion portion 200B may be set as the position.

In the case of the product 210 illustrated in FIG. 7, at least a part in the vicinity of the recess forming region 210B may be set as the position. That is, the sheet metal W may be cut using the oscillation pattern including the oscillation component of the y direction in a part (preferably, the entire portion) of the right and left surface parts and the bottom part of the recess portion 210r in FIG. 7. Additionally, the sheet metal W may be cut by a predetermined distance from the upper end of the right and left surface parts of the recess portion 210r in FIG. 7 along the upper end part of the product 210 using the oscillation pattern including the oscillation component of the y direction.

The position where the sheet metal W is cut using the oscillation pattern including the oscillation component of the y direction can be set to at least a part in the vicinity of the narrow protrusion portion in which the width of the product WP is equal to or less than a predetermined distance, or at least a part of the recess forming region formed with the narrow recess portion in which the width of the product WP is equal to or less than the predetermined distance.

The processing program which the computer device 2 creates as above is stored in a processing program database 60. The NC device 50 reads the processing program from the processing program database 60, and selects any of a plurality of processing conditions stored in a processing condition database 70. The NC device 50 controls the laser processing machine 100 to process the sheet metal W based on the read processing program and the selected processing condition.

The NC device 50 controls the galvano scanner unit 32 such that when the laser processing unit 20 cuts the product 200, in the position designated by the processing program, the sheet metal W is cut using any oscillation pattern including the oscillation component of the y direction illustrated in FIGS. 8B to 8F. The operator can select the oscillation pattern in advance by operating the operation unit 40.

If the processing program designates the vicinity of the protrusion portion 200B as the position where the sheet metal W is cut using the oscillation pattern including the oscillation component of the y direction, the laser processing unit 20 cuts the vicinity of the protrusion portion 200B while the laser beam is oscillated in the selected oscillation pattern. Accordingly, as illustrated in FIG. 10, the kerf width in the vicinity of the protrusion portion 200B can be widened, and the failure of the conveyance of the product 200 can be reduced.

The specific method to cut the vicinity of the protrusion portion 200B will be described using FIG. 11. The perpendicular oscillation pattern illustrated in FIG. 8B (FIG. 9) is selected. If a purpose is only widening the kerf width, the perpendicular oscillation pattern is sufficient. Since the perpendicular oscillation pattern does not include the oscillation component in the direction parallel to the cutting direction, the control of the galvano scanner unit 32 by the NC device 50 is simple compared to another oscillation pattern.

Figure 11:
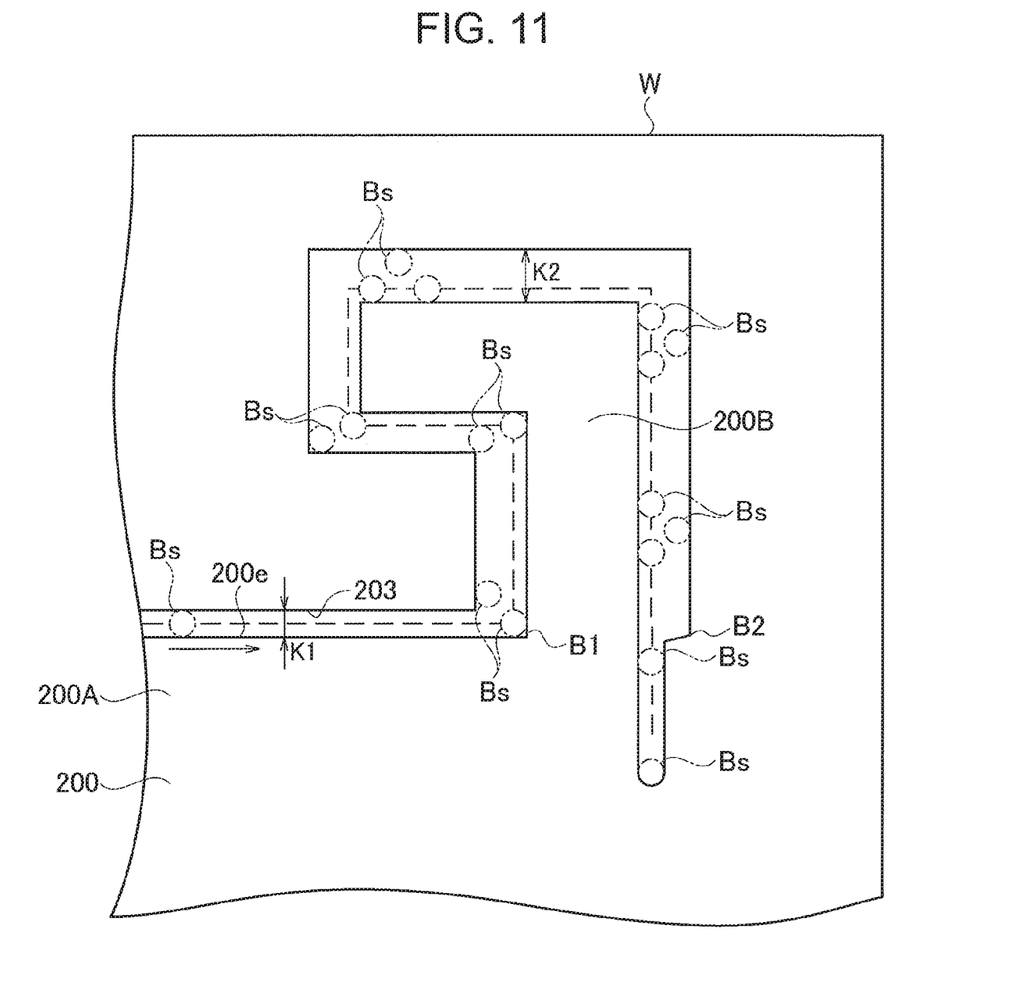
FIG. 11 is a partially enlarged view illustrating in detail a method of cutting a product from a sheet metal with the laser processing machine and the laser processing method according to one or more embodiments.

In FIG. 11, the laser processing machine 100 moves the beam spot Bs radiating to the sheet metal W in the cutting direction illustrated by an arrow along the end part 200e of the main portion 200A among the product 200. The groove 203 having the kerf width K1, which is almost a diameter of the beam spot Bs, is formed in the vicinity of the main portion 200A. When the vicinity of the main portion 200A is cut, the laser processing machine 100 may oscillate the beam spot Bs in the parallel oscillation pattern illustrated in FIG. 8A.

In the processing program, a range from the position B1 which is a boundary between the main portion 200A and the protrusion portion 200B to the position B2 which almost faces the position B1 is set as a range of oscillating the laser beam. After the beam spot Bs reaches the position B1, the NC device 50 starts the oscillation of the laser beam in the perpendicular oscillation pattern by the galvano scanner unit 32. The NC device 50 cuts the vicinity of the protrusion portion 200B while oscillating the laser beam in the perpendicular oscillation pattern, and stops the oscillation of the laser beam after the beam spot Bs reaches the position B2.

By oscillating the laser beam in the perpendicular oscillation pattern, the groove 203 has the kerf width K2 wider than the kerf width K1. After the beam spot Bs reaches the position B2, the laser processing machine 100 subsequently cuts the outer circumference of the main portion 200A. After the beam spot Bs reaches the position B2, the groove 203 returns to the kerf width K1.

In the portion of the kerf width K1 in the groove 203, the diameter of the beam spot Bs is a tool width. In the portion of the kerf width K2, the width when the beam spot Bs is oscillated in a perpendicular oscillation pattern is the tool width. When the groove 203 of the kerf width K1 is formed, the NC device 50 moves the processing head 35 such that a center of an opening 36a of a nozzle 36 is positioned on the line which is separated by the distance corresponding to the radius of the beam spot Bs from the outer circumference of the product 200 and is illustrated as a broken line.

Similarly to a case where the groove 203 of the kerf width K1 is formed, when the groove 203 of the kerf width K2 is formed, the NC device 50 moves the processing head 35 such that the center of the opening 36a is positioned on the line which is separated by the distance corresponding to the radius of the beam spot Bs from the outer circumference of the product 200 and is illustrated as a broken line. In order to form the groove 203 of the kerf width K2, the NC device 50 oscillates the beam spot Bs in the perpendicular oscillation pattern by the galvano scanner unit 32.

In this way, while the distance from the outer circumference cutting line of the product 200 of the processing head 35 is kept constant, the tool width is changed by the laser beam to change the kerf width, which is preferable. If the NC device 50 controls the processing head 35 and the galvano scanner unit 32 as described above, the kerf width can be changed only by the oscillation of the laser beam by the galvano scanner unit 32. Therefore, it is possible to realize a stable control system by suppressing excessive inertial vibration without generating displacement of the processing head 35.

After the beam spot Bs reaches the position B1, the laser processing machine 100 may oscillate scanning mirrors 321 and (or) 323 immediately in a maximum amplitude, or may oscillate the scanning mirrors such that the amplitude becomes the maximum after a predetermined time when the amplitude is gradually increased. After the beam spot Bs reaches the position B2, the NC device 50 may make the scanning mirrors 321 and (or) 323 immediately return to a reference angle and stops the oscillation, or may make the scanning mirrors return to the reference angle after the predetermined time when the amplitude is gradually reduced and the oscillation is stopped.

Also in another protrusion portion 200B (not illustrated in FIG. 11), similarly, the NC device 50 operates the galvano scanner unit 32 to cut the outer circumference of the protrusion portion 200B such that the groove 203 is widened to have the kerf width K2.

Figure 12:
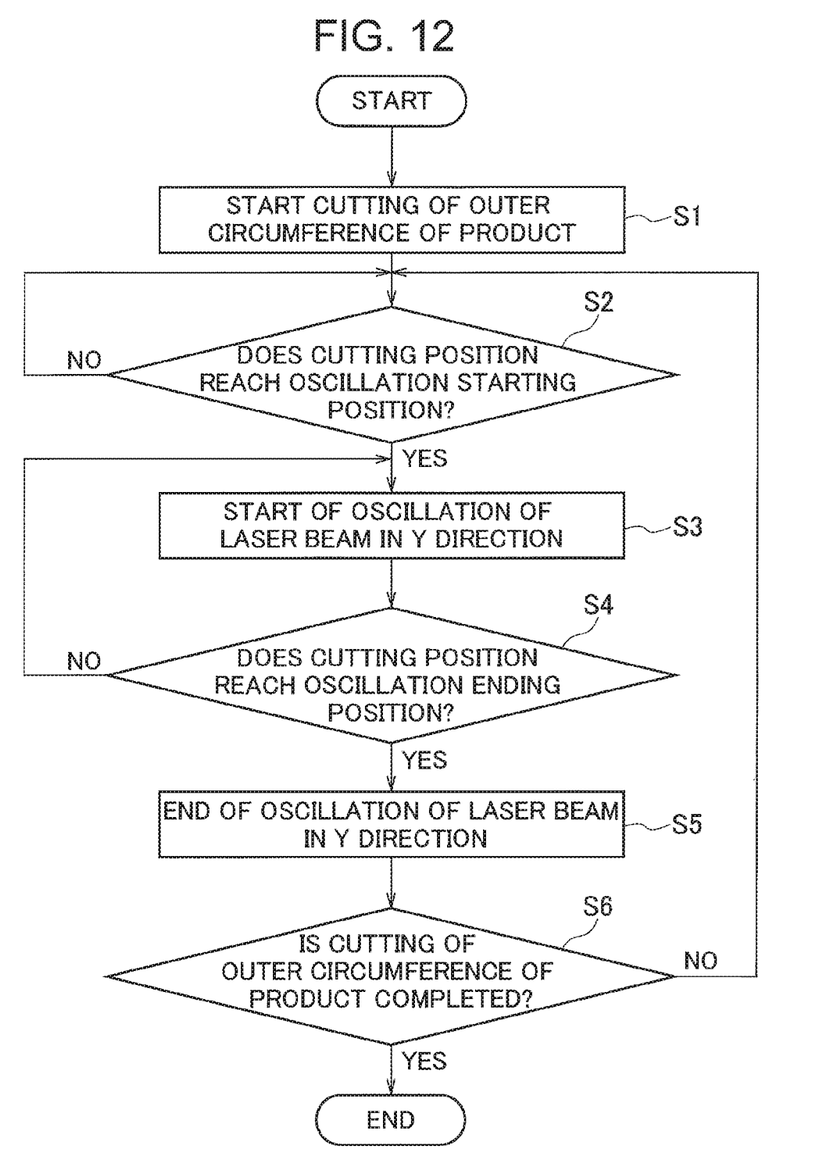
FIG. 12 is a flowchart illustrating a process of a product from a sheet metal with the laser processing machine and the laser processing method according to one or more embodiments.

The cutting process of the sheet metal W for manufacturing the product using the laser processing machine 100 of one or more embodiments and a laser processing method will be described with reference to the flowchart illustrated in FIG. 12. FIG. 12 does not illustrate a procedure of processing the pierce and the approach.

In FIG. 12, when the cutting process of the sheet metal W starts, in step S1, the laser processing machine 100 starts the cutting of the outer circumference of the product based on the control of the NC device 50. In step S2, the NC device 50 determines whether the cutting position reaches the oscillation starting position designated by the processing program. Unless the cutting position reaches the oscillation starting position (NO), the NC device 50 returns the procedure to step S2.

If the cutting position reaches the oscillation starting position (YES), in step S3, the NC device 50 operates the galvano scanner unit 32 to start the oscillation of the laser beam in the y direction. The oscillation pattern in step S3 may be any oscillation pattern among the oscillation patterns illustrated in FIGS. 8B to 8F.

In step S4, the NC device 50 determines whether the cutting position reaches an oscillation ending position. Unless the cutting position reaches the oscillation ending position (NO), the NC device 50 returns the procedure to step S3. If the cutting position reaches the oscillation ending position (YES), in step S5, the NC device 50 stops the operation of the galvano scanner unit 32 to end the oscillation of the laser beam in the y direction.

In step S6, the NC device 50 determines whether the cutting of the outer circumference of the product is completed. Unless the cutting of the outer circumference of the product is completed (NO), the NC device 50 returns the procedure to step S2. If the cutting of the outer circumference of the product is completed (YES), the NC device 50 ends the cutting process of the product.

In accordance with the above-described laser processing machine 100 and the laser processing method according to one or more embodiments, it is possible to reduce the failure of the conveyance apparatus 300 in the conveyance of the product WP cut by the sheet metal W. Incidentally, it is also considered that the laser beam is oscillated in the y direction in all of the vicinity of the product WP so that the kerf width is widened in all of the vicinity. However, when the kerf width is widened in all of the vicinity, the processing time is increased which is required for the sheet metal W to cut the product WP. According to the laser processing machine 100 and the laser processing method according to one or more embodiments, the kerf width is widened only in a specified place, and thus the processing time is increased only by a small degree.

The present invention is not limited to the above-described embodiments, and various modifications can be made without departing from the scope of the invention.

This application is based upon and claims the benefit of priority from German Patent Application No. 10 2018 203 899.6 filed on Mar. 14, 2018, the entire contents of which are incorporated herein by reference.

REFERENCE SIGNS LIST 1, 40: operation unit
2: computer device (CAM)
10: laser oscillator
12: process fiber
20: laser processing unit
30: collimator unit
31: collimation lens
32: galvano scanner unit
33: bend mirror
34: focusing lens
35: processing head
36: nozzle
36a: opening
50: NC device (control device)
60: processing program database
70: processing condition database
80: assist gas supply device
100: laser processing machine
200, 210, WP: product
300: conveyance apparatus
301: suction pad (holding unit)
321, 323: scanning mirror
322, 324: driver
W: sheet metal

The invention claimed is:

1. A laser processing machine comprising:
a processing head in which a nozzle is attached to a tip, the nozzle emitting a laser beam from an opening;
a focusing lens that is provided in the processing head and irradiates a sheet metal with the laser beam by focusing the laser beam, thereby forming a beam spot on a surface of the sheet metal;
a moving mechanism comprising an X-axis carriage and a Y-axis carriage configured to move a relative position of the processing head with respect to the surface of the sheet metal;
a beam oscillation mechanism comprising a pair of scanning mirrors and a pair of drivers for rotating the pair of scanning mirrors configured to oscillate the beam spot on the surface of the sheet metal by oscillating the laser beam emitted from the opening in the opening; and
an NC device configured to control the beam oscillation mechanism so as to oscillate the beam spot with an oscillation pattern including an oscillation component in a direction orthogonal to a cutting direction of the sheet metal in a non-holding region, in which a plurality of suction pads comprising a conveyance apparatus for conveying a product is not held, when cutting the product from the sheet metal by moving the relative position of the processing head using the moving mechanism and irradiating the sheet metal with the laser beam, the non-holding region being at least a part of a periphery of a protrusion portion of the product, or at least a part of a periphery of a recess forming region in which a recess portion of the product is formed.

2. The laser processing machine according to claim 1, wherein
the NC device is configured to control the beam oscillation mechanism so as to oscillate the beam spot with an oscillation pattern including only an oscillation component in the direction orthogonal to the cutting direction without including an oscillation component in a direction parallel to the cutting direction.

3. The laser processing machine according to claim 1, wherein
a position at which the beam spot is oscillated with the oscillation pattern including the oscillation component in the direction orthogonal to the cutting direction of the sheet metal is designated by a processing program for cutting the product from the sheet metal, and
the NC device is configured to control the beam oscillation mechanism so as to oscillate the beam spot at the position designated by the processing program.

4. A laser processing method comprising:
irradiating a sheet metal on a surface of a sheet metal from an opening of a nozzle with a focused laser beam;
moving a beam spot formed on the surface of the sheet metal along an end of a product so as to cut the product from the sheet metal; and
oscillating the beam spot in a non-holding region, in which a holding unit of a conveyance apparatus for conveying the product is not held, with an oscillation pattern including an oscillation component in a direction orthogonal to a cutting direction of the sheet metal when cutting a periphery of a protrusion portion of the product, or a periphery of a recess forming portion, the non-holding region being at least a part of a periphery of the protrusion portion or the recess portion, whereby a kerf width formed on the sheet metal is widened.

5. The laser processing method according to claim 4, further comprising:
oscillating the beam spot with an oscillation pattern including only an oscillation component in the direction orthogonal to the cutting direction without including an oscillation component in a direction parallel to the cutting direction.

6. The laser processing method according to claim 4, further comprising:
designating a position at which the beam spot is oscillated with the oscillation pattern including the oscillation component in the direction orthogonal to the cutting direction of the sheet metal by a processing program for cutting the product from the sheet metal; and
oscillating the beam spot at the position designated by the processing program.

\* \* \* \* \*